(12) United States Patent
Patel

(10) Patent No.: US 11,657,696 B2
(45) Date of Patent: May 23, 2023

(54) SYSTEM AND METHOD FOR TRACKING PATIENT ACTIVITY

(71) Applicant: KP INVENTIONS, LLC, Stoneham, MA (US)

(72) Inventor: Khamir Patel, Stoneham, MA (US)

(73) Assignee: KP INVENTIONS, LLC, Stoneham, MA (US)

( * ) Notice: Subject to any disclaimer, the term of this patent is extended or adjusted under 35 U.S.C. 154(b) by 0 days.

(21) Appl. No.: 17/724,659

(22) Filed: Apr. 20, 2022

(65) Prior Publication Data

US 2022/0343749 A1 Oct. 27, 2022

Related U.S. Application Data

(60) Provisional application No. 63/179,614, filed on Apr. 26, 2021.

(51) Int. Cl.
*G08B 21/22* (2006.01)
*G07C 1/02* (2006.01)

(52) U.S. Cl.
CPC .............. *G08B 21/22* (2013.01); *G07C 1/02* (2013.01)

(58) Field of Classification Search
CPC ............ G08B 21/22; G07C 1/02; G04F 8/006
See application file for complete search history.

(56) References Cited

U.S. PATENT DOCUMENTS

| | | | |
|---|---|---|---|
| 5,519,380 A * | 5/1996 | Edwards | G08B 21/22 340/8.1 |
| 6,544,200 B1 * | 4/2003 | Smith | A61B 5/6892 600/595 |
| 6,788,206 B1 * | 9/2004 | Edwards | G08B 21/22 340/573.7 |
| 7,504,955 B2 * | 3/2009 | Overturf | A61G 5/1075 340/573.7 |
| 9,380,682 B2 * | 6/2016 | Mead | G05B 19/042 |

(Continued)

FOREIGN PATENT DOCUMENTS

| | | |
|---|---|---|
| CN | 103330397 A | 10/2013 |
| CN | 112556747 A | 3/2021 |

(Continued)

OTHER PUBLICATIONS

Roman Gabl et al., "Development of a Sensor to Measure Physician Consultation Times", Sensors 2019, 19, 5359, Published: Dec. 5, 2019, https://www.ncbi.nlm.nih.gov/pmc/articles/PMC6960857/.

(Continued)

*Primary Examiner* — Hai Phan
*Assistant Examiner* — Son M Tang
(74) *Attorney, Agent, or Firm* — Maier & Maier, PLLC

(57) ABSTRACT

A system and method for tracking the duration of patient time in a dentist chair may be provided. The system may include at least one sensor, at least one microcontroller, and at least one remote server. The sensor and microcontroller arrangement may detect the presence of a patient in the chair and may record the duration of the patient's presence and upload the data to the server. The system and method may further account for temporary patient departures from the chair by creating a time threshold, under which a visit duration calculation will not be reset. The system and method may record a total duration of a patient's time in the dentist chair.

17 Claims, 9 Drawing Sheets

(56) References Cited

U.S. PATENT DOCUMENTS

| | | | | |
|---|---|---|---|---|
| 9,668,927 | B2* | 6/2017 | Campbell | A61G 5/10 |
| 9,795,322 | B1* | 10/2017 | Karunaratne | A61B 5/6891 |
| 9,815,407 | B1 | 11/2017 | Anderson | |
| 9,824,573 | B1* | 11/2017 | Beres | A47C 7/723 |
| 10,433,646 | B1* | 10/2019 | Schmidt | A47C 1/143 |
| 10,445,463 | B2* | 10/2019 | Baudino | G16H 20/00 |
| 10,614,694 | B1* | 4/2020 | Zwier | G08B 21/0461 |
| 10,627,538 | B2* | 4/2020 | Hergott | A47C 1/13 |
| 2001/0001237 | A1* | 5/2001 | Stroda | A61B 5/1117 |
| | | | | 600/595 |
| 2004/0019501 | A1* | 1/2004 | White | G16H 15/00 |
| | | | | 705/2 |
| 2004/0046668 | A1* | 3/2004 | Smith | A61B 5/6892 |
| | | | | 340/573.7 |
| 2004/0239161 | A1* | 12/2004 | Lee | A47C 7/72 |
| | | | | 297/217.3 |
| 2005/0121959 | A1* | 6/2005 | Kruse | A61G 5/1089 |
| | | | | 297/330 |
| 2008/0100108 | A1* | 5/2008 | Fullmer | A47D 1/00 |
| | | | | 297/217.4 |
| 2008/0255876 | A1* | 10/2008 | Larsen | G06Q 10/02 |
| | | | | 705/2 |
| 2012/0139732 | A1* | 6/2012 | Smith | A61B 5/746 |
| | | | | 340/573.1 |
| 2013/0325526 | A1* | 12/2013 | Tyler | G06Q 10/02 |
| | | | | 705/5 |
| 2014/0269215 | A1* | 9/2014 | Almirall | A47C 31/126 |
| | | | | 368/9 |
| 2014/0337045 | A1* | 11/2014 | Scrivner | G16H 20/17 |
| | | | | 705/2 |
| 2015/0170494 | A1* | 6/2015 | Hsu | A61B 5/1117 |
| | | | | 340/539.17 |
| 2015/0242578 | A1 | 8/2015 | Siemon | |
| 2016/0078740 | A1* | 3/2016 | Pirio | A61G 7/0527 |
| | | | | 340/573.4 |
| 2016/0327922 | A1* | 11/2016 | Sekiguchi | H04N 21/42201 |
| 2017/0050467 | A1* | 2/2017 | Sigal | B60B 33/0092 |
| 2017/0052678 | A1* | 2/2017 | Karasawa | G06F 3/04883 |
| 2017/0124289 | A1* | 5/2017 | Hasan | G16H 10/60 |
| 2017/0221072 | A1* | 8/2017 | AthuluruTlrumala | |
| | | | | G06Q 10/109 |
| 2017/0236398 | A1* | 8/2017 | Eddy | A61B 5/6892 |
| | | | | 340/573.5 |
| 2017/0332459 | A1* | 11/2017 | Morrison | G06Q 10/06 |
| 2017/0337591 | A1* | 11/2017 | Ali | G06Q 30/0269 |
| 2018/0005510 | A1* | 1/2018 | Okada | A61B 5/1115 |
| 2018/0043794 | A1 | 2/2018 | Lilley et al. | |
| 2018/0125416 | A1* | 5/2018 | Schwarz | A61B 5/1128 |
| 2018/0140097 | A1* | 5/2018 | Adler | A47C 1/11 |
| 2018/0271286 | A1* | 9/2018 | Jacobs | A47C 7/727 |
| 2018/0271287 | A1* | 9/2018 | Jacobs | A47C 1/124 |
| 2018/0350144 | A1* | 12/2018 | Rathod | H04W 4/021 |
| 2018/0360348 | A1* | 12/2018 | Lin Charna | A61B 5/7455 |
| 2019/0149745 | A1* | 5/2019 | Green | G06V 10/40 |
| | | | | 348/159 |
| 2019/0325777 | A1* | 10/2019 | Heuvelink-Marck | G09B 5/00 |
| 2021/0024103 | A1* | 1/2021 | Hara | G01C 21/3407 |
| 2021/0027485 | A1* | 1/2021 | Zhang | G06V 10/82 |
| 2021/0169234 | A1* | 6/2021 | Jacobs | A47C 1/02 |
| 2022/0027785 | A1* | 1/2022 | Cheng | G06Q 50/12 |

FOREIGN PATENT DOCUMENTS

| | | |
|---|---|---|
| CN | 108741822 B | 6/2021 |
| FR | 2690774 B1 | 8/1996 |
| WO | 2017132240 A1 | 8/2017 |

OTHER PUBLICATIONS

Jehni Robinson et al., "Losing the wait: improving patient cycle time in primary care", BMJ Open Quality 2020, https://www.researchgate.net/publication/341206446_Losing_the_wait_improving_patient_cycle_time_in_primary_care.

Notification of Transmittal of the International Search Report and the Written Opinion dated Jun. 22, 2022 in corresponding International Application No. PCT/US2022/025502; 9 pages.

* cited by examiner

|       | Mon | Tue | Wed | Thu | Fri | Sat |
|-------|-----|-----|-----|-----|-----|-----|
| 09:00 | 0   | 0   | 5   | 0   | 4   | 0   |
| 10:00 | 4   | 4   | 3   | 2   | 4   | 0   |
| 11:00 | 7   | 6   | 6   | 4   | 8   | 4   |
| 12:00 | 8   | 9   | 6   | 4   | 4   | 2   |
| 13:00 | 3   | 2   | 4   | 0   | 4   | 5   |
| 14:00 | 4   | 2   | 7   | 6   | 7   | 2   |
| 15:00 | 7   | 6   | 6   | 3   | 8   | 4   |
| 16:00 | 11  | 5   | 4   | 5   | 5   | 0   |
| 17:00 | 3   | 7   | 0   | 8   | 0   | 0   |
| 18:00 | 0   | 1   | 0   | 3   | 0   | 0   |

SYSTEM AND METHOD FOR TRACKING PATIENT ACTIVITY

BACKGROUND

Businesses, such as dentist offices, must efficiently manage appointment scheduling to maximize patient visits and improve office operations. Visit data, including time spent in a dentist chair may be critical to improving office efficiencies and scheduling efficiencies. Conventional practices may utilize recording patient visit statistics and are dependent on humans to input correct data; however, these statistics may not show specific time that a patient spends in a dentist chair and can be inaccurate due to human error or because missing one event can cause major deviations in the data set. Therefore, it may be desirable to provide a system and method for recording specific patient data including, but not limited to, the duration of time spent in a dentist chair during a visit without human interaction.

SUMMARY

According to at least one exemplary embodiment, a system and method for tracking the duration of patient time in a dentist chair may be provided. The system may include at least one sensor, at least one microcontroller, and at least one remote server. The sensor and microcontroller arrangement may detect the presence of a patient in the chair and may record the duration of the patient's presence and upload the data to the server. The system and method may further account for temporary patient departures from the chair by creating a time threshold, under which a visit duration calculation will not be reset. The system and method may record a total duration of a patient's time in the dentist chair.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 4 is an exemplary graphic displaying tracking data;

DETAILED DESCRIPTION

Figure 1:
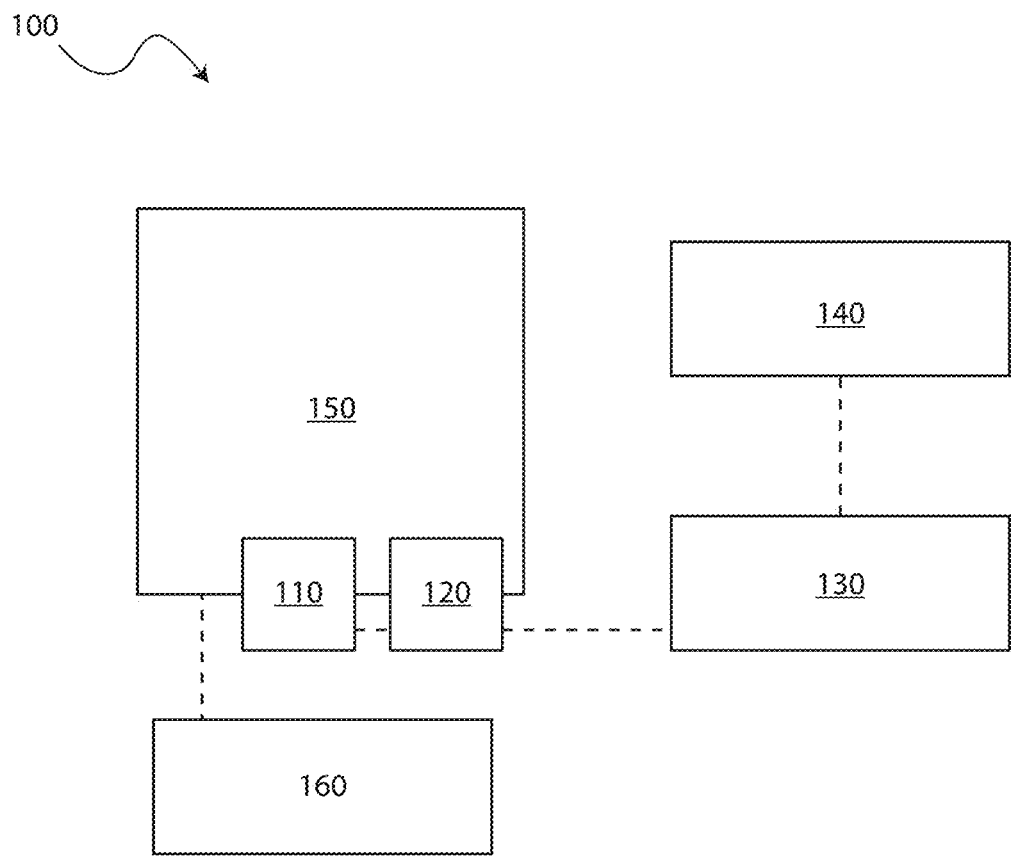
FIG. 1 is an exemplary diagram showing components of a system for tracking activity.
Figure 2:
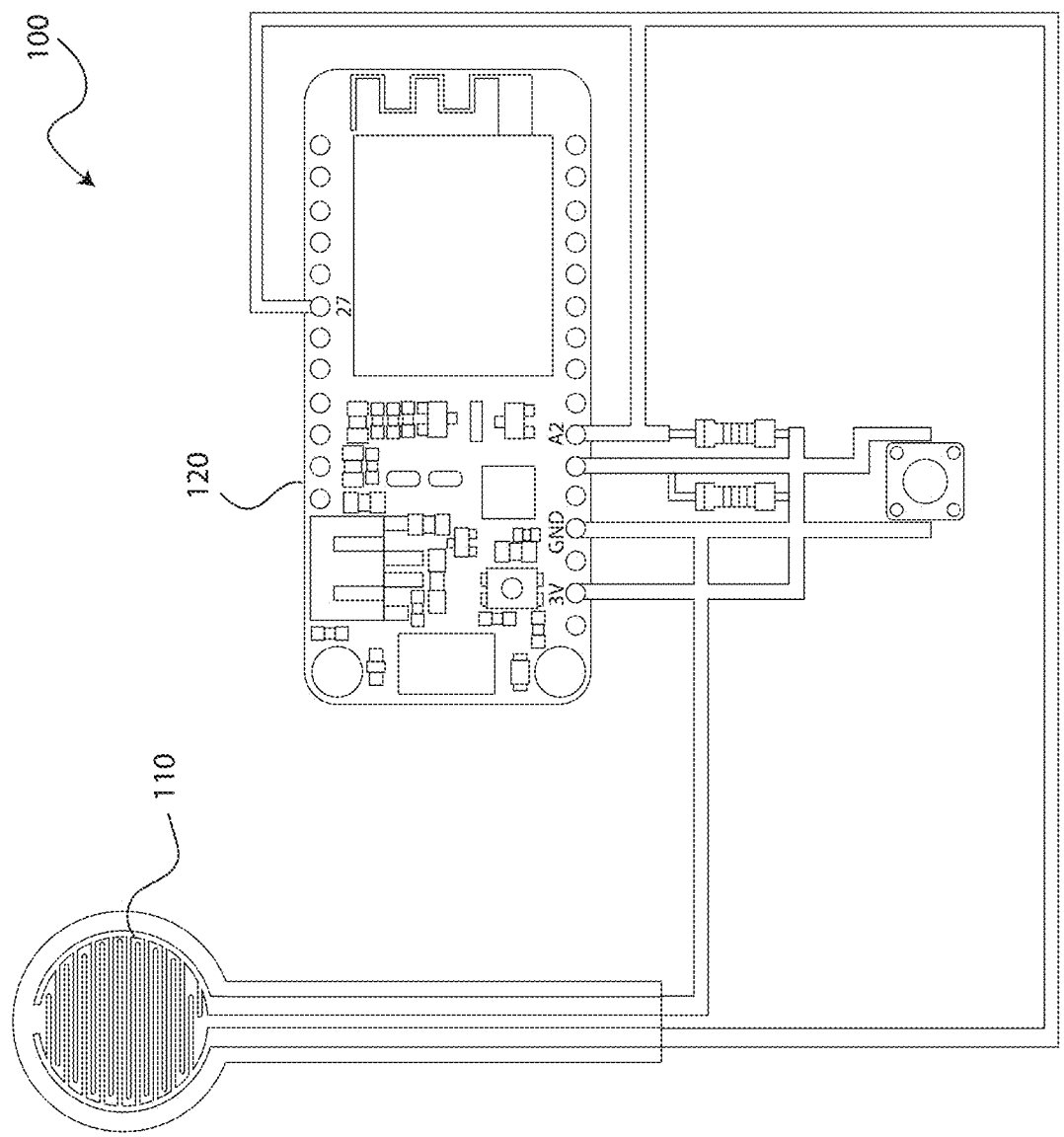
FIG. 2 is an exemplary circuit diagram showing components of a system for tracking activity.
Figure 3:
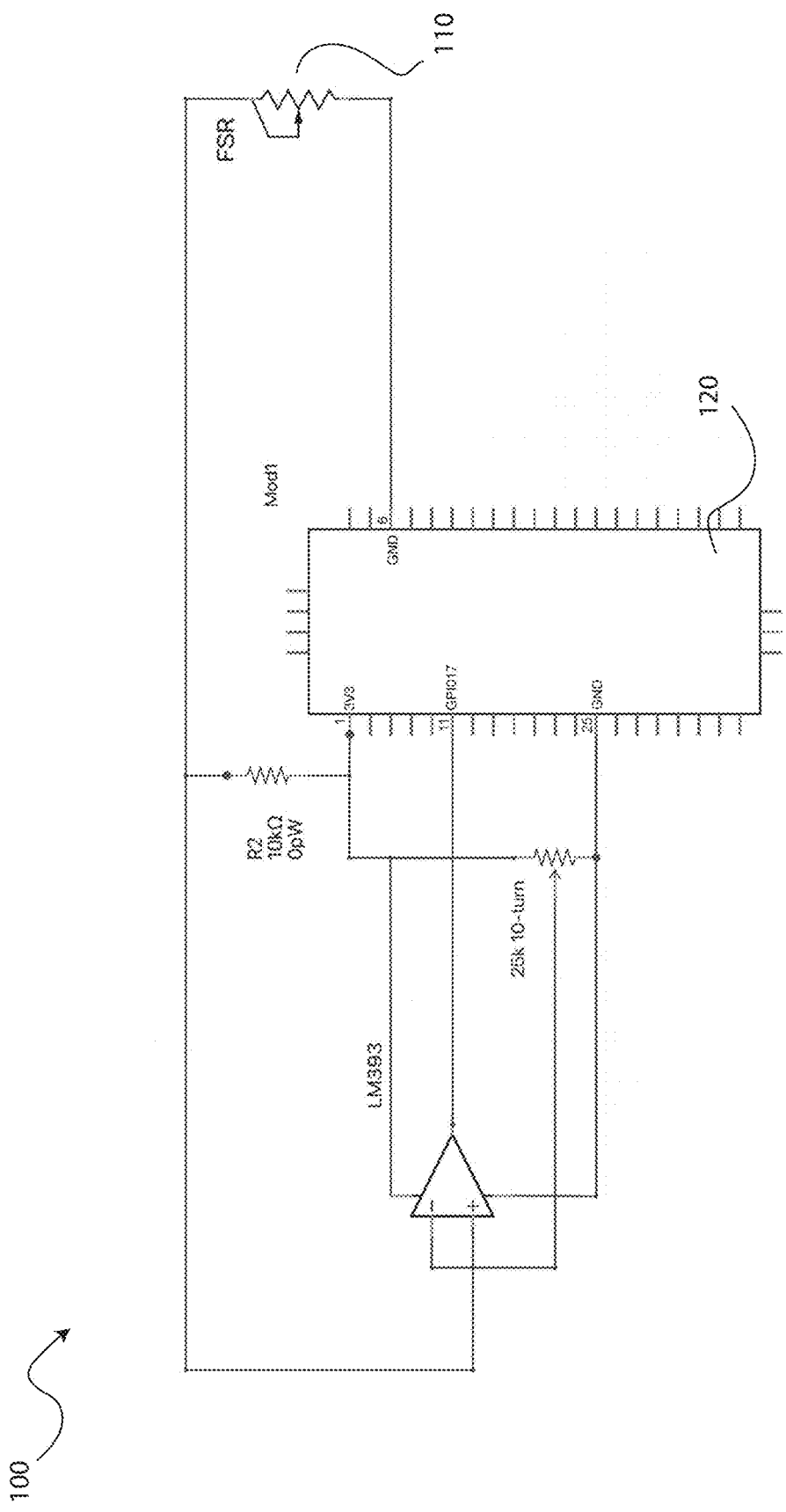
FIG. 3 is an exemplary circuit diagram showing components of a system for tracking activity.
Figure 5:
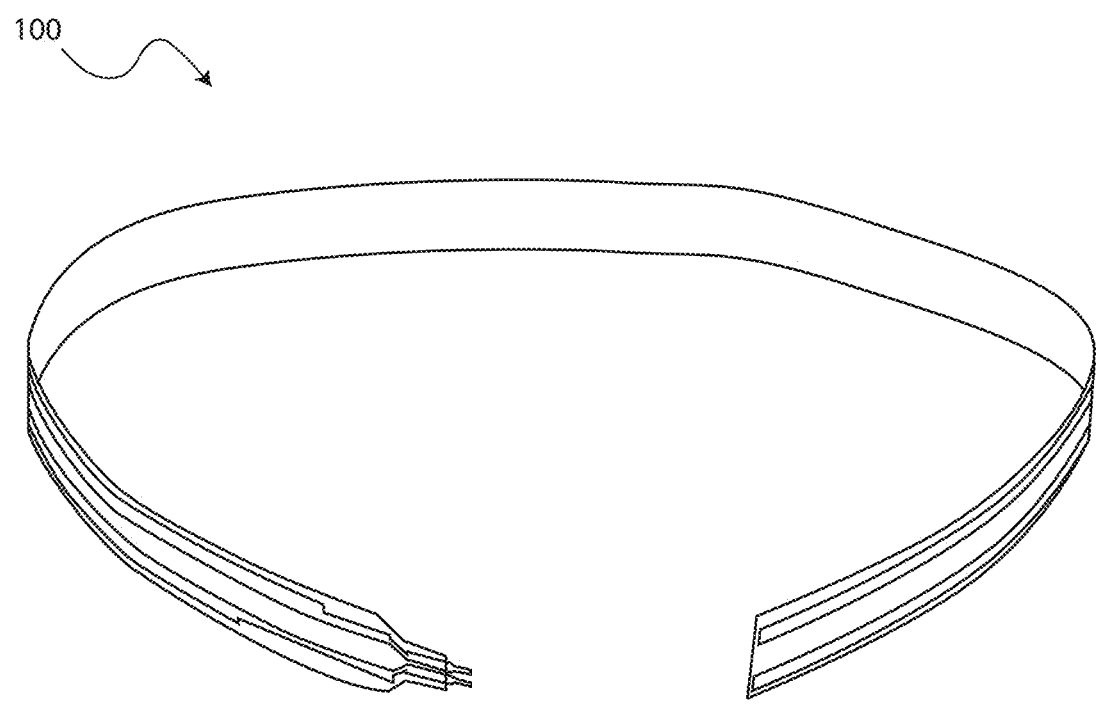
FIG. 5 is an exemplary embodiment of a sensor.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to an exemplary embodiment and referring to the FIG. 1-9 generally, a system and method for tracking patient activity may be provided. More specifically, the system and method may track the time that patients are in a dental chair, which may provide data for improving efficiency of a dental office. It may be understood that a similar system and method may be used by any industry where customer visit timing data can be utilized to improve efficiency. Customer visit timing may include any combination of wait time, service time, post service wait time, and check-out time. Particular to the dental industry, tracking a patient's time specifically spent in a dental chair may provide significant data for improving efficiency. Time in a dental chair may include waiting for a hygienist, being serviced by a hygienist, waiting for a dentist, being serviced by a hygienist, waiting for imaging, performing imaging services, waiting for follow-up services by a dentist or hygienist, and conclusion of an appointment, which could include scheduling of a follow-up. A dental office may have multiple dental chairs, which may be serviced by a number of hygienists and dentists. Scheduling appointments to efficiently cycle patients and minimize their time in a dental chair can improve efficiency of the practice by maximizing a number of appointments and reducing visit time for patients. Also, understanding patterns, such as average time taken to perform a specific procedure by a provider, can help customize required appointment times specific to that provider, which may in turn improve efficiencies.

According to an exemplary embodiment, a system 100 may include a sensor 110 for detecting the presence of a patient in a dental chair 150. The sensor 110 may optionally be a force sensor, a pressure sensor, a load sensor, an infrared (IR) sensor, or a thermal sensor. According to some exemplary embodiments, sensor 110 may optionally be a force sensing resistor ("FSR"). The sensor may be located in, on, or under a cushion of a dental chair, in or on the frame of a dental chair, or a surface attached to or below a dental chair. According to some exemplary embodiments, sensor 110 may be a thermal sensor, which may detect the presence of a patient by sensing a temperature change due to body temperature. According to other exemplary embodiments, sensor 110 may be a pressure or force sensor, which may determine a patient's presence in a dental chair by detecting weight in the dental chair. In still further exemplary embodiments, multiple sensors may be incorporated in a dentist chair to determine the presence of a patient. For example, at least one force or pressure sensor, at least one thermal sensor, or at least one force pressure sensor and at least one thermal sensor may be used.

In addition to sensor 110, system 100 may include a microcontroller 120. The microcontroller 120 may be designed to control the detection of a patient in a dental chair using the sensor arrangement 110. The microcontroller 120 may be communicatively coupled to the sensor arrangement 110. The coupling may optionally be wired or wireless. Microcontroller 120 may include code capable of logging data onto a log file. The data may, for example, include detection data from the one or more sensor. According to an exemplary embodiment, the microcontroller may create a log file including the time and/or duration of detection by the sensor arrangement. The data collected by the sensor 110 and microcontroller 120 system may be uploaded and recorded via connection to a server. The connection may be wired or wireless. According to an exemplary embodiment, data may be uploaded via WiFi to a web-based server or database.

According to some exemplary embodiments, the system 100 may record duration data. System 100 may start a timer when sensor 110 detects the presence of a patient in a dentist chair and may end the timer when sensor 110 detects that a patient exits the dentist chair. According to still further exemplary embodiments, system 100 may account for instances where a patient may depart the dentist chair and return within the same appointment. For example, if a patient leaves the chair temporarily to visit a bathroom, to remove a piece of outerwear, or for imaging outside of the normal dentist chair, it may be desirable to continue recording the patient's visit duration without resetting the visit data when the patient returns to the dentist chair. Therefore, the system 100 may have a pre-set threshold, which may be an allowance of time that a patient can depart the chair and return without resetting the data collection. According to an exemplary embodiment, the threshold may range from approximately 30 seconds to approximately 10 minutes. According to further exemplary embodiments, the threshold may be any desired duration. The microcontroller 120 or single board computer may be capable of implementing the functions disclosed herein.

Sensor 110 may be capable of detecting not only a patient sitting in a dentist chair through the sensing of a force or temperature, but also may be capable of continuously monitoring the presence of the patient in the chair through continued recognition of the force or temperature indicative of the patient's presence in the dentist chair. This capability may include detecting when a patient leaves a chair through the removal of a sensor detected force or temperature variant. When the sensor detects the removal of a force or otherwise detects the departure of a patient from the chair, the system and/or microcontroller may begin counting the pre-set departure allowance threshold. When the pre-set departure allowance threshold has been reached, the system may record an end of the patient visit. According to an exemplary embodiment, a patient visit duration counter may simultaneously continue counting when the threshold allowance is being counted or calculated. If the threshold allowance is not met before a patient returns to the chair, the threshold allowance counter may end and the visit duration counter may continue. If the threshold allowance is reached, the threshold allowance counter and the visit duration counter may end. The system may further revise the visit duration calculation by subtracting the pre-set threshold allowance value. According to some alternative embodiments, the visit duration counter may pause when a threshold allowance counter is initiated by the detection of a patient's departure from the chair. In such embodiments, the pre-set threshold allowance may not be subtracted when the threshold allowance is reached, as would be understood by a person having ordinary skill in the art. Furthermore, in such embodiments, when the threshold allowance is not reached, the time counted by the threshold allowance counter may be added to the patient visit duration.

According to an exemplary embodiment, a sensor 110 may be a force sensing resistor (FSR) sensor, as would be understood by a person having ordinary skill in the art. The FSR sensor 110 may be capable of logging the whole duration of a patient's time in the chair. The sensor 110 may turn on or initiate an action when weight or force is sensed and turn off or end an action when weight is removed and sensor 110 may be capable of sensing continuously for a long duration. As opposed to embodiments with conventional weight sensors, the calculation may continue even when resistance is broken, so long as the threshold referenced above is not broken. Sensor 110 may be adjustable such that the sensor sensitivity can be adjusted to desired ranges to trigger the sensor for one or both of ON-OFF or OFF-ON events. According to some embodiments, sensitivity may be adjusted for one or both of ON-OFF or OFF-ON events based on target occupants. For example, pediatric dental offices may have a lower weight threshold to trigger a recording by sensor 110 than an office that traditionally only sees adult patients. Furthermore, sensors placed on chairs that can be reclined may have adjusted sensor sensitivity to account for effects of gravity on weight distribution.

Sensor 110 may optionally be a flexible sensor, which may be capable of being bent or deformed by elasticity of a cushion on which or in which it is mounted. This may be the case with an exemplary FSR sensor 110. The force registered from the deformation caused by the elasticity of a cushion may be registered by the senor, which may create a false positive indication of a patient in a chair. Therefore, the sensor may be zeroed after installation on or in a cushion. By zeroing out any forces enacted by the cushion, false positives may be avoided. According to still further exemplary embodiments, sensor 110 may be secured to a cushion such that when a cushion is deformed, it stretches or applies pressure on sensor 110 indicating the presence of a patient or person. Zeroing may be performed locally and/or remotely. Zeroing may be performed locally by programming the microcontroller. Zeroing may be performed remotely by setting a threshold via the cloud or a web server.

The system 100 may further include a server 130, which may store recorded data. A computing device with a graphical user interface 140 may also be provided for displaying and interacting with the recorded data. According to some exemplary embodiments, the system may use the data to create visuals, such as heat maps displaying the recorded data for a user, as shown in exemplary FIG. 4. The heatmap 142 may, for example, show chair occupancy by week day and time over a given period. According to an exemplary embodiment, the heat map may show data over periods such as a month, six months, a year, or all-time. The data may be automatically and continuously updated to provide feedback in real-time.

Still further, an exemplary office may include multiple chairs. Therefore, system 100 may be capable of recording data from multiple sensor arrangements 110 associated with respective chairs. Each chair may also have a respective microcontroller 120 associated with the sensor arrangement 110. The data may be recorded to a common server or database or may be recorded to unique servers or databases. Data may optionally be combined or compiled for one or more or for all device in order to create a combined dataset, which may be used, for example, to generate a combined heat map. Furthermore, colors on a heat map may be standardized via a selection box, which may make it standard across different device or device sets for easy comparison. According to an exemplary embodiment, the data may be recorded to a common server with a unique identifier assigned to each chair, as would be understood by a person having ordinary skill in the art. The respective chair sensor and microcontroller may upload data to the server with a unique identifier and the data may be processed and displayed accordingly.

According to some exemplary embodiments, the sensor may detect the presence of any force, while in other embodiments, there may be a force threshold to indicate the presence of a patient. According to still further embodiments, the sensor sensitivity may be adjusted to desired ranges. In a dental office with multiple chairs or even chairs in multiple rooms, this may provide for continuous monitoring of the occupancy of all chairs in the office, even where the chairs are not simultaneously visible to an observer.

As referenced above, system 100 may be utilized in any healthcare setting, customer service setting, or industry setting where it may be desirable to sense the duration of the presence of an item on a surface. For example, a sensor arrangement may be implemented in a gurney, chair, or table.

According to an exemplary method of tracking patient activity, a system may activate a visit duration counter when a sensor detects the presence of a patient. If the sensor detects the departure of the patient from the chair, a threshold allowance counter may be initiated. If the threshold is not met, the visit duration counter may continue. If the threshold is met, the duration visit counter may end and the visit duration may be calculated and recorded to a server. If the threshold was not met and the visit duration counter continued, the process may repeat each time a patient departure from the chair is detected until the threshold is met.

According to an exemplary embodiment, data recorded by the system may include one or more of a date, a day of the week, a visit start time or initial chair detection time, detection time of a patient in the chair, detection time of chair departures, final chair departure time of a visit, number of unique visits per day or other specified period, and a duration of the patient time in the chair for a respective patient.

According to some further exemplary embodiments, the system may record force values exerted on the respective sensors. The system may record a reading of a specific force applied on a force sensing resistor or sensor. The system may constantly monitor the forces to track force patterns and flag instances that may indicate discrepancies. For example, the system may detect that the same force is applied on a chair at repeated or consistent intervals or continuously for an extended period of time, which could indicate that the reading is not due to a patient in a chair. An extended period may be set as a maximum threshold for detecting a person. This reading could, for example, indicate a box or object that is placed on a chair every day with the same weight. The system may utilize Artificial Intelligence or machine learning to identify data or patterns, which may indicate detection of a force that is not a patient or a desired reading. Furthermore, the system may be capable of simultaneous real-time monitoring of chair occupancy for one or more chairs and one or more offices.

In still further exemplary embodiments, the system may allow two-way communication among devices. There may be established a two-way communication channel to check in real time if a chair is occupied or not and the settings may be capable of being adjusted in real time, while in other alternative embodiments, hardware may register an event and then communication may be lost.

According to at least one exemplary embodiment, system or device 100 may have three sensors, which may work in an either/or configuration. Activating any one of the sensors 110 may trigger events. Sensors 110 may be placed in various locations to ensure a presence is detected, such as one sensor on a bottom seat, one sensor on a back portion, and a back-up sensor positioned as would be understood by a person having ordinary skill in the art. In some embodiments, sensor 110 may be a long, thin sensor, which may be an FSR sensor. According to other embodiments, sensor 110 may be custom designed to unique dimensions in order to achieve maximum coverage of an intended surface of use. Sensor 110 may, for example, be approximately 100 mm to approximately 300 mm in length and approximately 100 mm to approximately 200 mm in width, or in more specific embodiments approximately 155 mm in width. Sensor 110 may extend across a complete width of a seating arrangement, such as a dental chair. This may improve detection of the presence of a patient. According to some exemplary embodiments, sensor 110 may also include an attachment element to secure to a surface. Attachment element 112 may be, for example, an adhesive strip. Alternatively, sensor 110 may freely rest adjacent to a surface or be affixed by other attachment elements such as stitching, stapling, or other fasteners as would be understood in the art.

System 100 may also include microcontroller 120, which may be capable of storing events on device RAM, which can be retrieved in the case of network failure. The stored events may be retrieved once a network connection is reestablished and may prevent loss of data in the event of an internet connection, network, or other communication interruption. According to some exemplary embodiments, microcontroller 120 may, for example, store up to approximately 100 events or a set duration of recording, as would be understood by a person having ordinary skill in the art.

System 100 may also include a power supply 160, which may be a direct power supply connection or a battery unit. Power supply 160 may include a direct power supply connection with a battery backup in order to prevent loss of data in the case of power or network failure. In some embodiments, which may include a battery unit as the sole power supply 160, a large capacity battery unit may be provided, which can operate up to approximately 3 months of use with approximately 20 events per day.

Figure 6:
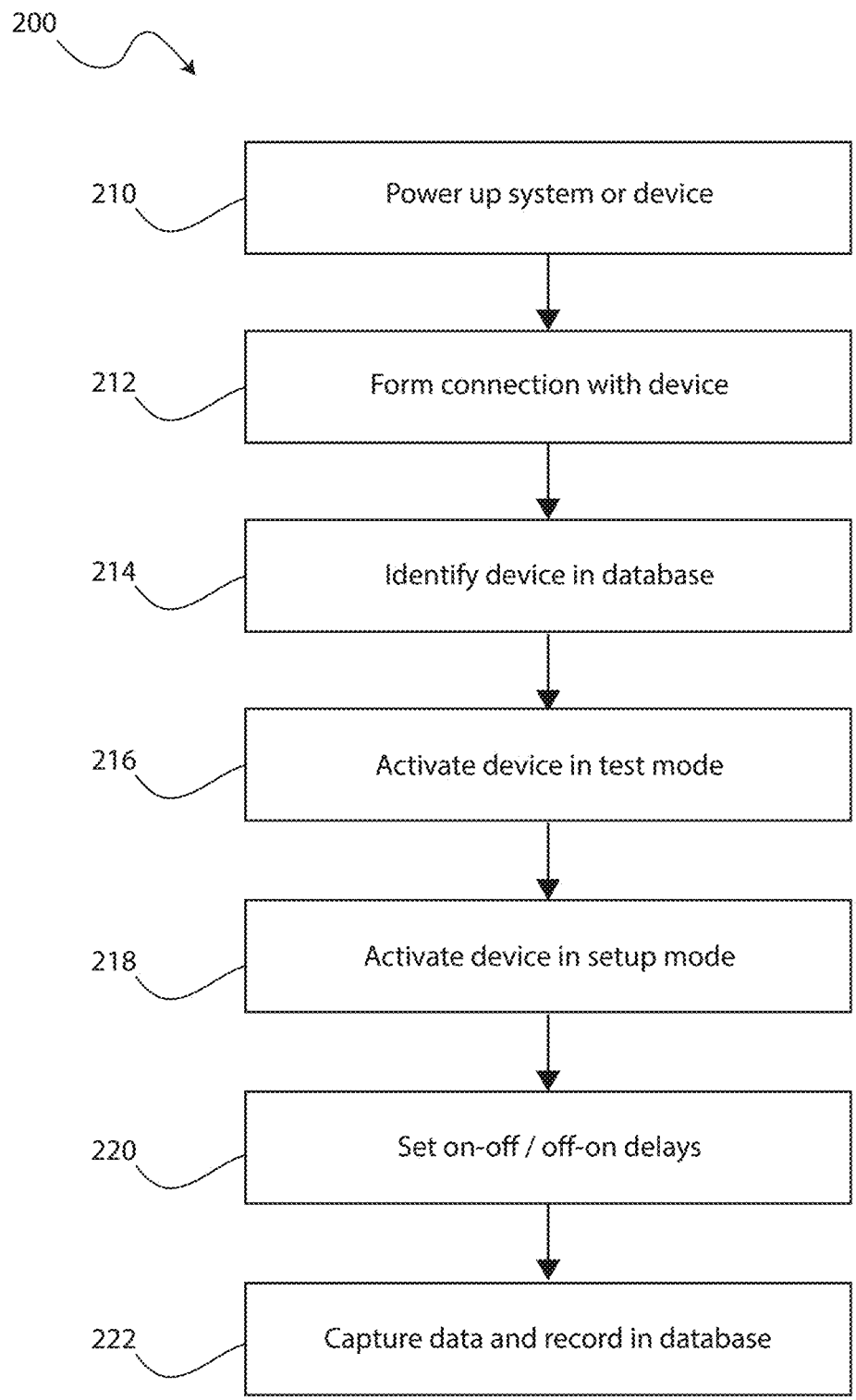
FIG. 6 is an exemplary flow chart showing a method of setup and workflow of a system for tracking activity.

Now referring to exemplary FIG. 6, a method for tracking activity 200 may be provided. According to an exemplary embodiment, the system or device may include three FSR sensors, a microcontroller unit, and a battery unit. It may be understood by a person of ordinary skill in the art, that the method may be performed with alternative embodiments, such as those described herein. A system or device may be powered up 210, which may cause the device to begin acting as an access point. The device may be visible by other devices on a network, such as by appearing on a device list displayed by a media access control (MAC) address. A direct connection may be formed with the device 212, such as by selecting the device. According to exemplary embodiments of a device, such as a sensor device, a variety of communication connections may be used, such as wired, ethernet, WiFi, Bluetooth, NFC, or other data transfer technologies, as would be understood in the art. A web browser may be used to establish a connection between a device and a WiFi or other network source. The system or device may optionally have an incorporated, preconfigured network connection or connection to an internet hotspot. Once a connection is established to a communication network or the internet, the device may send a connected message to a cloud network and may optionally default to a deep sleep mode. This may provide an ability to initiate setup at a later time without having to coordinate at the site versus remote setup. Therefore, when setting up a new chair with a tracking system, the chair specific system may simply be connected to the communication network, such as the internet. The rest of the set up, such as the remaining configuration, may optionally be performed remotely via the cloud or communication network.

Next, the device may be named in a database 214 for easy identification. The device may then be activated in test mode, which may allow the device to capture values in a continuous loop from all three sensors may save them to the database 216. These values may, for example, be FSR values. The data may then be used as a guideline for setting up the device and may be unique to the placement of each sensor.

The device may then be activated in a setup mode, which may allow the sensor values to be set or adjusted 218 in order to prevent existing tension or readings from the installation on or inside a cushion, upholstery, or chair from triggering a false "on" event. The sensors may be zeroed once in an installed state. In a setup mode or screen, there may also be an option to add or adjust a desired sensor value threshold and/or time threshold value for detecting a desired event, as would be understood by a person of ordinary skill in the art. The device or system may automatically perform this process by pulling test data from the cloud without human intervention and may zero the sensors and set a sensor value threshold and/or time threshold value as indicated above. Sensor value thresholds may depend on the sensor and may, for example, be a weight threshold, a force threshold, a temperature threshold, or other value as would be understood by a person having ordinary skill in the art.

Next, the system may optionally be set to have an ON-OFF and OFF-ON delay 220, as detailed above, which may allow for creating a data set of a number of visits in addition to capturing total time occupied during an event. The programming of the desired delay may keep data on events accurate by, for example, not starting a new event when a person temporarily removes force from the sensor, such as by getting up to retrieve something or reaching for something in a manner that shifts force applied on one or more of the sensors. Still further, there may be an ability to configure an ON to OFF (ON-OFF) threshold individually from an OFF to ON (OFF-ON) threshold. According to some exemplary embodiments, the threshold may be in addition to a tare value 230, which may account for a margin of error. For example, an ON-OFF threshold may be in addition to a tare value of +200 and an OFF-ON threshold may have a tare value of +100. This may be lower than an ON-OFF threshold to take into account any residual deformity in a surface when a load is lifted. In the example above, the 100 difference between the values may help offset any residual deformity because of a removed load.

Finally, the data may be captured and recorded in a database 222. The database may capture sensor values, such as FSR values, for each event along with a timestamp. Artificial intelligence and machine learning components may be used to determine patterns, such as whether the same sensor value is triggering an On event across several days, which might indicate a similar weight object is being used to trigger the event, as described above. This may help identify and prevent false positive events.

Figure 7:
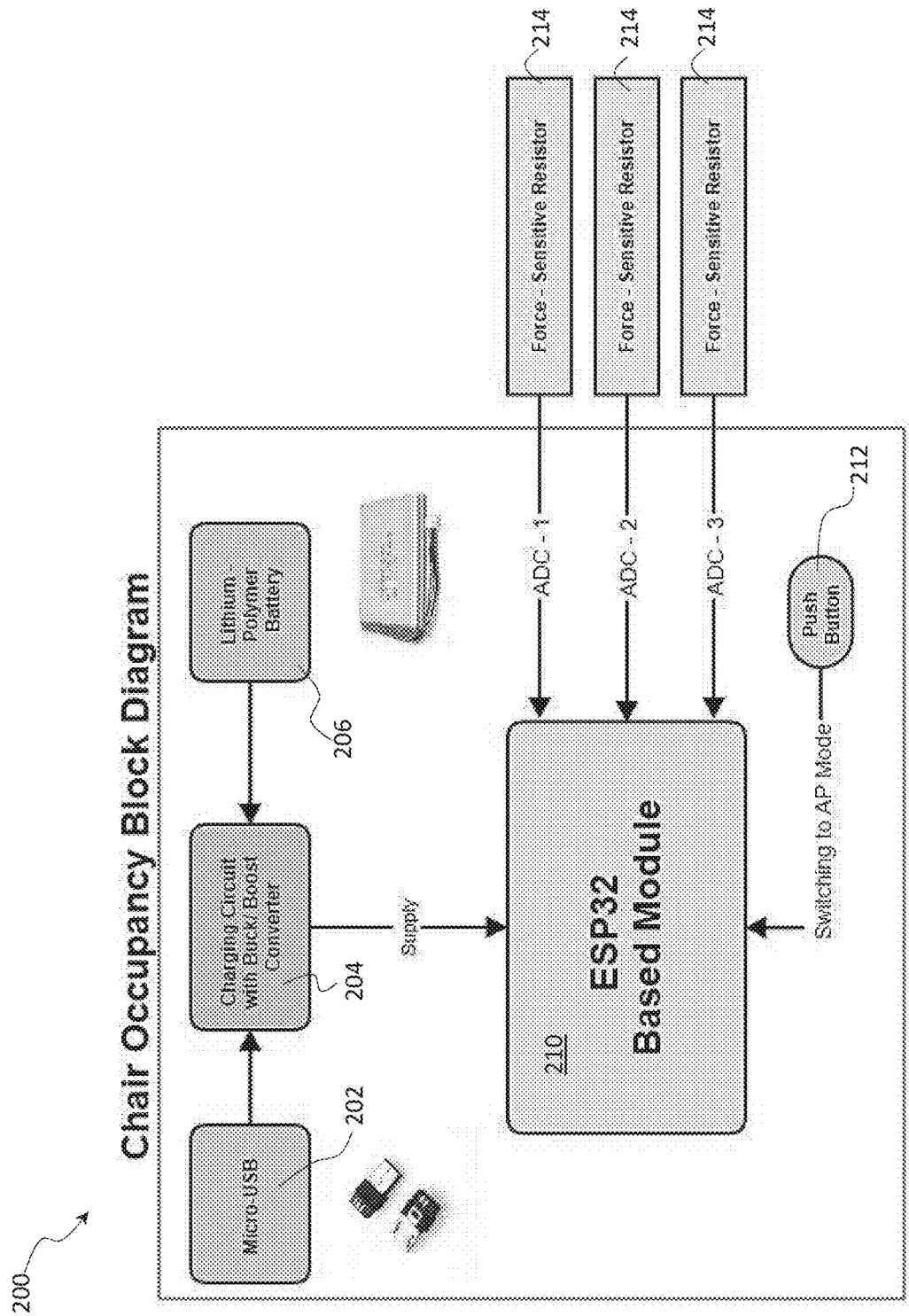
FIG. 7 is another exemplary block diagram showing components of a system for tracking activity.
Figure 8:
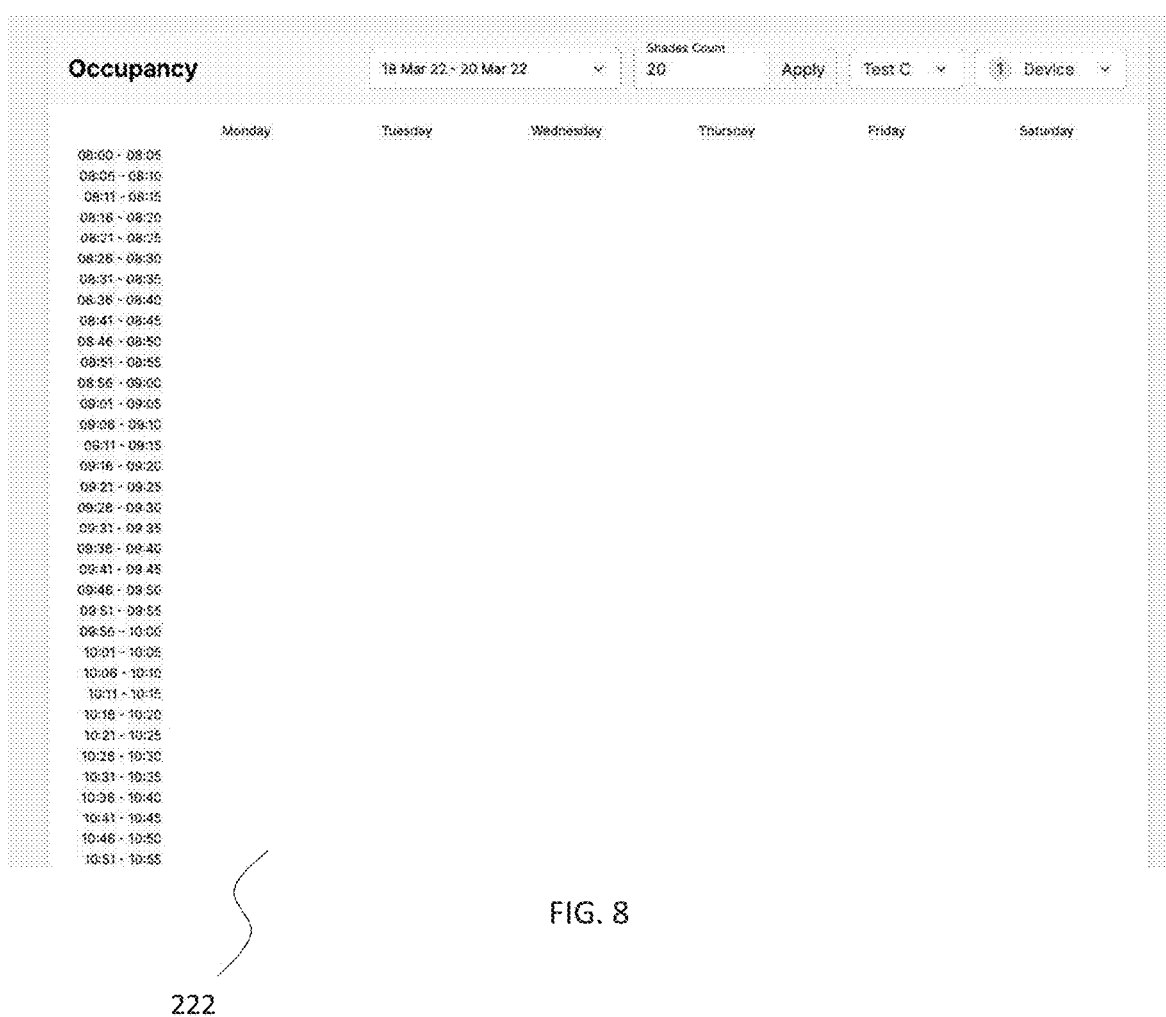
FIG. 8 is an exemplary dataset recorded by the system.
Figure 9:
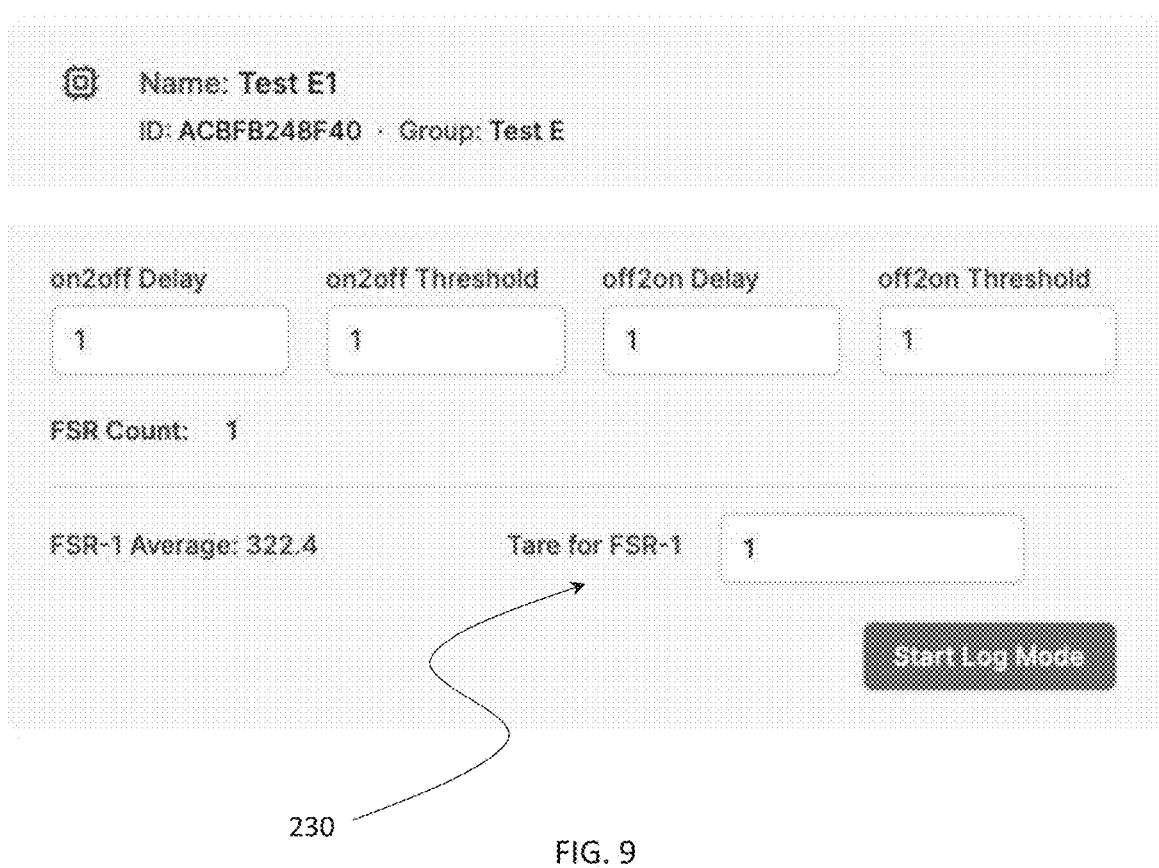
FIG. 9 is an exemplary setting interface for the system.

According to exemplary FIG. 7, a block diagram of another exemplary embodiment of a system for tracking activity 200 may be provided. The system may include supply elements, such as a micro-USB, USB, or other connected device 202; a charging circuit 204, which may optionally have a buck/boost converter; a battery 206, such as a lithium polymer batter or any other battery as would be understood in the art. System 200 may also include a module 210. According to some embodiments the module may be an ESP32 based module or other modules as would be understood in the art. Module 210 may also have a push button 212 or other actuator for switching modes, such as to AP mode. Furthermore, system 200 may utilize force sensitive resistors 214 coupled to the module 210 to record data.

The recorded data from the database may be used to create visualizations, such as heat maps, to display and determine occupancy of a business or location and improve efficiency. The datasets and/or visualizations may optionally be standardized by a user. The same data may also be used in real-time to efficiently move team members in an establishment. The data may be recorded and updated in real-time across multiple chairs within a location and also across multiple remote locations.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for tracking healthcare appointment activity comprising:
   continuously monitoring for presence instances on a dental chair by at least one sensor;
   detecting a presence on the dental chair;
   determining whether the presence exceeds a predetermined sensor threshold;
   initiating a detection duration recording if the presence exceeds the predetermined sensor threshold;
   detecting an exit of the presence;
   calculating departure time;

determining whether a pre-set departure allowance threshold has been reached;

ending the detection duration recording if the departure allowance threshold is met; and detecting a return of the presence on the dental chair and continuing a detection duration recording if the departure allowance threshold is not met and repeating until a pre-set departure allowance threshold has been reached; and calculating a total appointment time based on the detection duration recording, wherein the total time is adjusted to include departure time for departures when the presence returns and the pre-set departure allowance has not been reached and to not include departure time for departures when the pre-set departure allowance is reached, wherein the departure time is time from the exit of the presence until the presence returns or the pre-set departure allowance has been reached.

2. The method of claim 1, further comprising determining the presence is a person when the sensor threshold is exceeded.

3. The method of claim 1, further comprising recording sensor values and time data for each event.

4. The method of claim 3, further comprising generating a heat map using recorded event and time data.

5. The method of claim 1, further comprising utilizing artificial intelligence to identify an undesired presence or event, wherein the artificial intelligence or machine learning unit identifies false readings by detecting a similar force is repeatedly applied at consistent intervals or is applied continuously for an extended period.

6. The method of claim 1, further comprising simultaneously monitoring and recording dental chair occupancy data in real-time for multiple dental chairs.

7. The method of claim 6, wherein at least two of the multiple dental chairs are in independently remote facilities.

8. The method of claim 1, further comprising zeroing the at least one sensor value after installation, setting an ON-OFF threshold, and setting an OFF-ON threshold.

9. The method of claim 1, further comprising continuing the detection duration recording despite force variation or when resistance is broken, so long as the sensor threshold is not broken.

10. A system for tracking activity comprising:
at least one sensor installed on a dental chair and configured to continuously detect the presence of an object or person on the dental chair;
a microcontroller; and
at least one database,
wherein the system records detection duration data,
wherein a departure allowance threshold counter and sensor threshold are pre-set to determine desired event data,
wherein a total appointment time is calculated based on the detection duration data, wherein the total appointment time includes departure time when departure time ends within the departure allowance threshold and wherein the total appointment time does not include departure time for departure instances when the departure allowance threshold is met.

11. The system of claim 10, wherein the at least one sensor is a force sensing resistor and is disposed in a cushion of the dental chair or between the cushion and a dental chair frame.

12. The system of claim 10, further comprising two or three sensors installed on the dental chair, wherein at least one of the sensors is a force sensing resistor disposed in a cushion of the dental chair or between the cushion and a dental chair frame.

13. The system of claim 10, further comprising at least one sensor installed on two or more dental chairs and configured to continuously and simultaneously detect presence instances in real-time on the two or more dental chairs.

14. The system of claim 13, wherein the two or more dental chairs are in at least two remote locations.

15. The system of claim 10, further comprising a remote server.

16. The system of claim 10, further comprising an artificial intelligence or machine learning unit to identify data or patterns indicating false readings, wherein the artificial intelligence or machine learning unit identifies false readings by detecting a similar force is repeatedly applied at consistent intervals or is applied continuously for an extended period.

17. The system of claim 10, wherein the system continues to record detection duration data despite force variation or when resistance is broken, so long as the sensor threshold is not broken.

* * * * *